Patented Apr. 27, 1948

2,440,649

UNITED STATES PATENT OFFICE 2,440,649

N-4-(QUINAZOLINE) AMINO BENZOYL GLUTAMIC ACID

Souren Avakian, Oreland, and Gustav J. Martin, Philadelphia, Pa., assignors to The National Drug Company, Philadelphia, Pa., a corporation of Pennsylvania No Drawing. Application January 18, 1947, Serial No. 722,972

4 Claims. (Cl. 260—251)

This invention relates to new glutamic acid derivatives which are particularly effective as vitamins and chemo-therapeutic agents and processes whereby they may be produced.

It is an object of this invention to produce new chemotherapeutic agents which are characterized by vitamin-like properties. A further object is to produce new compounds which may be used as substitutes for folic acid, since they apparently possess the desirable properties of this vitally important chemotherapeutic agent. A still further object is to produce N-[4{(4-quinazoline)amino}benzoyl]glutamic acid. Additional objects will become apparent from a consideration of the following description and claims.

It is well known that folic acid is an essential metabolite. It has the vital property of liberating and maturing both white blood cells and red blood cells. If this compound is present in insufficient quantities the body immediately indicates a lack of white and red blood cells and evidences both leukopenia and anemia. The compounds of this invention appear to possess the foregoing folic-acid properties to an appreciable extent. These compounds are, therefore, of profound importance in the therapeutic field.

We have found that N-[4{(4-quinazoline)-amino}benzoyl]glutamic acid possesses the folic acid properties mentioned previously to an unusual extent. This compound may be prepared by reacting 4-chloroquinazoline with N-p-aminobenzoyl glutamic acid in absolute alcohol. This reaction is illustrated by the following example:

*N-[4{(4-quinazoline) amino}benzoyl]glutamic acid*

A solution of 4.1 g. (.025 mole) of 4-chloroquinazoline in 50 cc. of ethyl alcohol was added to 7 g. (.025 mole) of N-p-aminobenzoyl glutamic acid, dissolved in 75 cc. of ethyl alcohol. The resulting mixture was heated at 50–55° C. for one hour and then refluxed for half an hour. The whole precipitate was filtered, dissolved in dilute ammonium hydroxide solution, and precipitated with acetic acid. The filtered precipitate was washed with a little cold water, and then with hot alcohol to give the pure product melting at 240–242° C. The yield was 6.3 g.

Each of the intermediates used in the above example may be prepared by processes heretofore described in the scientific literature.

The above example may be repeated substituting the following quinazoline derivatives for the 4-chloroquinazoline:

5-chloroquinazoline
6-chloroquinazoline
7-chloroquinazoline
8-chloroquinazoline
4-chloro-5-methyl quinazoline
4-chloro-6-methoxy quinazoline
The corresponding bromo-derivatives of the above
Other alkyl and alkoxy derivatives of these compounds.

It is to be understood that the conditions of reaction for the production of the compounds of this invention may be varied considerably without departing from the scope of this invention. The intermediates employed, the amounts thereof and the conditions of reaction may be varied appreciably without departing from the scope of this invention.

The compound of the above example, as mentioned heretofore, is a surprisingly effective substitute for folic acid. The derivatives thereof which are referred to above, and their equivalents, likewise appear to possess this desirable property to an appreciable extent.

The compounds of this invention may be taken either orally or by injection, and the dosage for the average patient may vary from as little as a few milligrams to as much as one-half or three-quarters of a gram per day, generally divided into two or three doses. These compounds are also beneficial when admixed with folic acid or administered in conjunction therewith.

As many apparently widely different embodiments of this invention may be made without departing from the spirit and scope hereof, it is to be understood that the invention is not limited to the specific embodiments hereof except as defined in the appended claims.

We claim:

1. Compounds having the following general formula:

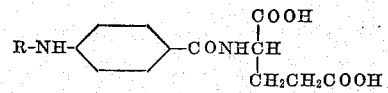

wherein R represents a quinazoline radical.

2. N-[4{(4-quinazoline) amino}benzoyl]glutamic acid.

3. A process which comprises reacting an ethyl alcohol solution of a halogented quinazoline and N-p-aminobenzoyl glutamic acid at elevated temperatures, and removing the resulting precipitate therefrom.

4. A process which comprises reacting an ethyl alcohol solution of 4-chloroquinazoline and N-p-aminobenzoyl glutamic acid at elevated temperatures, and removing the resulting precipitate therefrom.

SOUREN AVAKIAN.
GUSTAV J. MARTIN.